April 7, 1931.  C. E. MOORE  1,799,311
FEED SCREW LIMIT GAUGE FOR LATHES
Filed Oct. 3, 1927
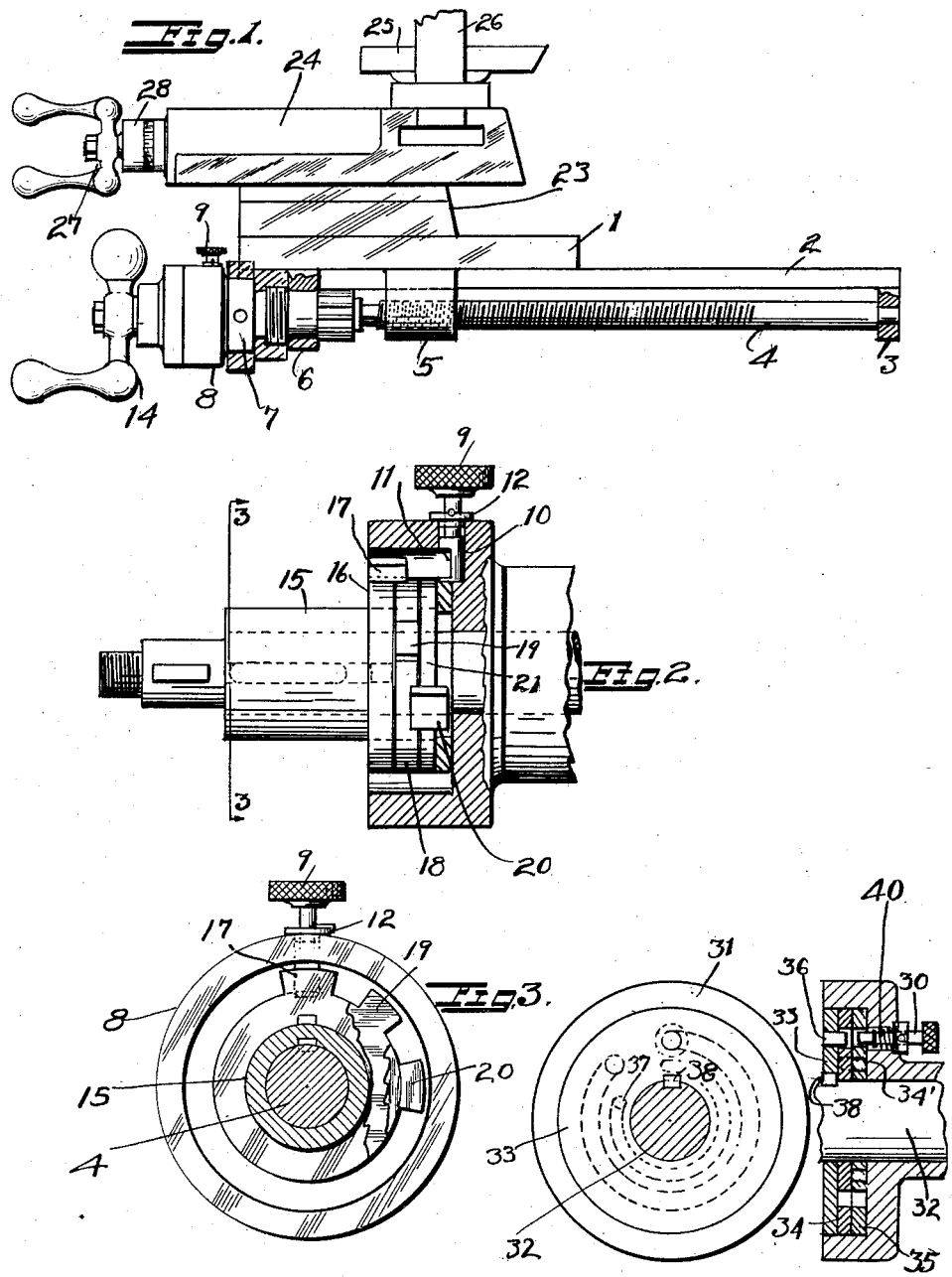
INVENTOR.
Charles E. Moore.
BY Carlos P. Griffin
ATTORNEY.

Patented Apr. 7, 1931

1,799,311

UNITED STATES PATENT OFFICE

CHARLES E. MOORE, OF SAN FRANCISCO, CALIFORNIA

FEED-SCREW LIMIT GAUGE FOR LATHES

Application filed October 3, 1927. Serial No. 223,503.

This invention relates to a feed screw limit gauge for lathes, and its object is to provide means whereby the cutting tool may be drawn back from the position in which it is being used to effect a given result, and moved to another position on the work, and then restored to its initial position, the final position of the cutting tool being determined by the operation of another micrometer screw.

In the operation of lathes this particular apparatus is intended to make it possible to more efficiently handle the cutting of screws, and the shaping of pieces to be turned where it is desired to restore the cutter to the opposite end of the piece being operated upon and in precisely the same distance from the piece being operated upon, the final position of the cutter being adjusted with a separate micrometer screw.

With the present invention means is provided to turn the screw a given number of turns at the end of which the screw is stopped and the cutting tool moved to the opposite end of the apparatus or article being operated upon, whereupon the tool may be restored to its original position at the predetermined original distance from the center of the piece being operated upon by turning the screw in the opposite direction a given number of turns, and the apparatus is intended to permit the ordinary operation of the screw should that be desired without interference from this particular setting device.

While in the present case it has been stated that this invention is particularly applicable to the carriage of a lathe, it will be understood by those skilled in the art that there are a number of ways in which this particular apparatus can be used on lathes or other cutting machinery of that character, whether the present invention be applied to a so called lathe table carriage carrying a cutter, or to any work table where it might be more satisfactory to move the work back from the cutter instead of the cutter away from the work, the principal object being to restore the relative position of cutter and work without the necessity of making accurate measurements or examinations of the micrometer or measuring apparatus to effect this result.

A particular object of this invention is to facilitate the making of duplicate parts, the apparatus being arranged to permit the tool to be moved away from the work, and after it has been moved to a new place to be returned to precisely its original position with respect to the axis of the lathe.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a view in end elevation along the length of the lathe carriage,

Figure 2 is a sectional view of the stop device showing the movable stop disk,

Figure 3 is a view on the plane 3—3 Figure 2 looking in the direction of the arrows showing the lugs on the three stop disks, Figure 4 is a side elevation of a slightly modified form of the disk stops in which slots are used to effect the stopping of the speed screw in the stead of outwardly projecting lugs, and Figure 5 is a vertical sectional view of the modified form shown in Figure 4.

The numeral 1 indicates the cross slide which has guides 2 carrying a bearing 3 for the feed screw 4. The feed screw passes through a depending threaded bearing 5 from the slide, and is also supported by a bearing 6.

The cross slide also has a recess therein in the front of the bearing 6 to receive the small end 7 of a boss 8. This boss has a pin 9 therein, which pin extends into the boss and has a portion thereof solid as indicated at 10, and a notch cut therein as indicated at 11, the object being to permit the lugs on the disks which are operated by the feed screw to pass by this pin, or to be stopped thereby as may be desired. A washer 12 secured on the top of the boss 8 prevents the pin from being withdrawn from the proper position but enables it to be turned 90 or 180 degrees at will. On the outer end the feed screw is provided with a small balanced hand crank 14, and attached to the feed screw is a collar 15 which carries a disk 16, said disk having a lug 17 which projects from the periphery thereof and over the periphery of still a second disk 18 which latter disk moves in contact with the disk 16.

Secured on the disk 18 is a lug 19 which is arranged to come in contact with a lug 20 on the disk 21. The lug 20 projects on both sides of the disk 21 and if the feed pin 9 is turned so that its solid part 10 projects over the path occupied by one side of the lug 20 it will stop the feed screw when precisely three turns have been made thereby enabling the workman to know that he has moved the cutting tools just three turns away from the article being operated upon by the lathe.

The carriage 1 carries a table 23 on which the tool carrier 24 is mounted, and this tool carrier is arranged so that it can hold the cutting tool 25 held in place by means of the standard 26 back and forth any desired amount by the operation of the feed screw on which the crank 27 is placed, the exact amount being determined by the micrometer 28.

It will be clear that the disks 16, 18 and 21 may be provided with slots instead of being cut away on the periphery, and this form of the invention is illustrated in Figures 4 and 5. In this form of the invention the stop pin 30 is shown on the back of a boss 31, this boss is fixed with respect to the lathe, and the feed screw shaft 32 passes therethrough and carries the three disks 33, 34 and 35. The disk 33 has a pin 36 projecting into a slot in the disk 34, while the disk 35 has a pin 37 projecting into that slot far enough to be engaged by the disk in the proper time, but not far enough to be engaged by the pin 36. A pin or key 38 secures the disk 33 in a fixed position on the shaft 32.

Now it will be seen that if the feed screw is rotated the disk 33 will be carried along therewith, but it will not engage and move the disk 34 until the pin 36 comes to the end of the slot in the disk 34, and similarly that disk will not move the disk 35 until it has made one complete turn forward to be stopped by the pin 30.

The pin 30 has a spring 40 which holds it normally in the position shown, but it may be removed from engagement with the disk 35 and turned so as to hold it out of engagement therewith.

Having thus described my invention, what I desire to secure by Letters Patent of the United States is as follows, but modifications may be made in carrying out the invention as shown in the drawings and in the above particularly described form thereof, within the purview of the annexed claims:

1. A feed screw stop for lathes comprising a feed screw for operating the carriage on a lathe, a disk fixed to turn with said screw, a projecting lug on said disk, a second disk loosely mounted adjacent said first disk, and having a lug adapted to be engaged by said projecting lug to cause the two disks to revolve together, a third disk loosely mounted adjacent to the second disk and having a lug projecting on both sides of said disk adapted to be engaged by the lug on the second disk, a stop pin adapted to engage the lug on said third disk, whereby said feed screw can be turned approximately one revolution for each of said disks and means to move said stop pin to allow the feed screw to turn without limit.

2. In a device of the class described comprising a tool holding table, a lathe feed carriage supporting the same, a feed screw for shifting the carriage, a fixed disk on said screw, a series of loosely mounted disks on the feed screw one operating the other by means of lugs, a movable stop adapted to engage the lug on the last of the series of disks, whereby the feed screw may be turned not more than a fixed number of turns to stop the feed screw when it is to be restored to precisely its initial position, and to stop the feed screw when the cutter has been moved away from the work.

3. In a device of the class described, a tool holding table, a carriage supporting the same, a feed screw for the carriage, a fixed disk on said screw, a series of loosely mounted disks on the feed screw co-operating with each other and the fixed disk, a fixed stop for the disks whereby the screw may be turned a fixed number of turns, to stop the feed screw or to permit it to be turned an indefinite number of turns at will, and means interacting between the feed screw disk and the loosely mounted disks to stop the feed screw when it has been moved a fixed number of turns toward the axis of the lathe.

4. In a device of the class described comprising a tool holding table, a lathe carriage supporting said table, a feed screw for shifting the carriage, a fixed disk on said screw, a series of loosely mounted disks on the feed screw one operating the other by means of lugs to enable the feed screw to be turned a fixed number of turns in either direction, and a movable stop to permit the feed screw to be turned an indefinite number of turns at will.

In testimony whereof I have hereunto set my hand this 24th day of September, A. D. 1927.

CHARLES E. MOORE.